F. V. DETWILER.
COOKING APPARATUS.
APPLICATION FILED SEPT. 18, 1911.
1,125,075.
Patented Jan. 19, 1915.
5 SHEETS—SHEET 2.
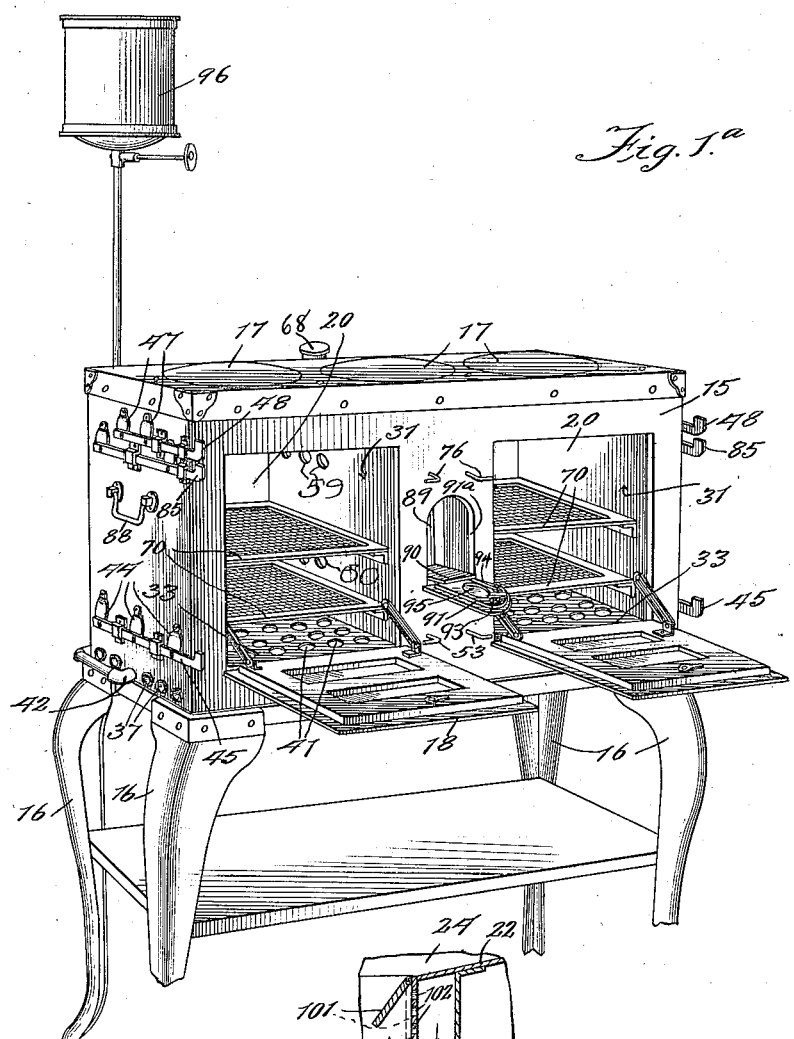

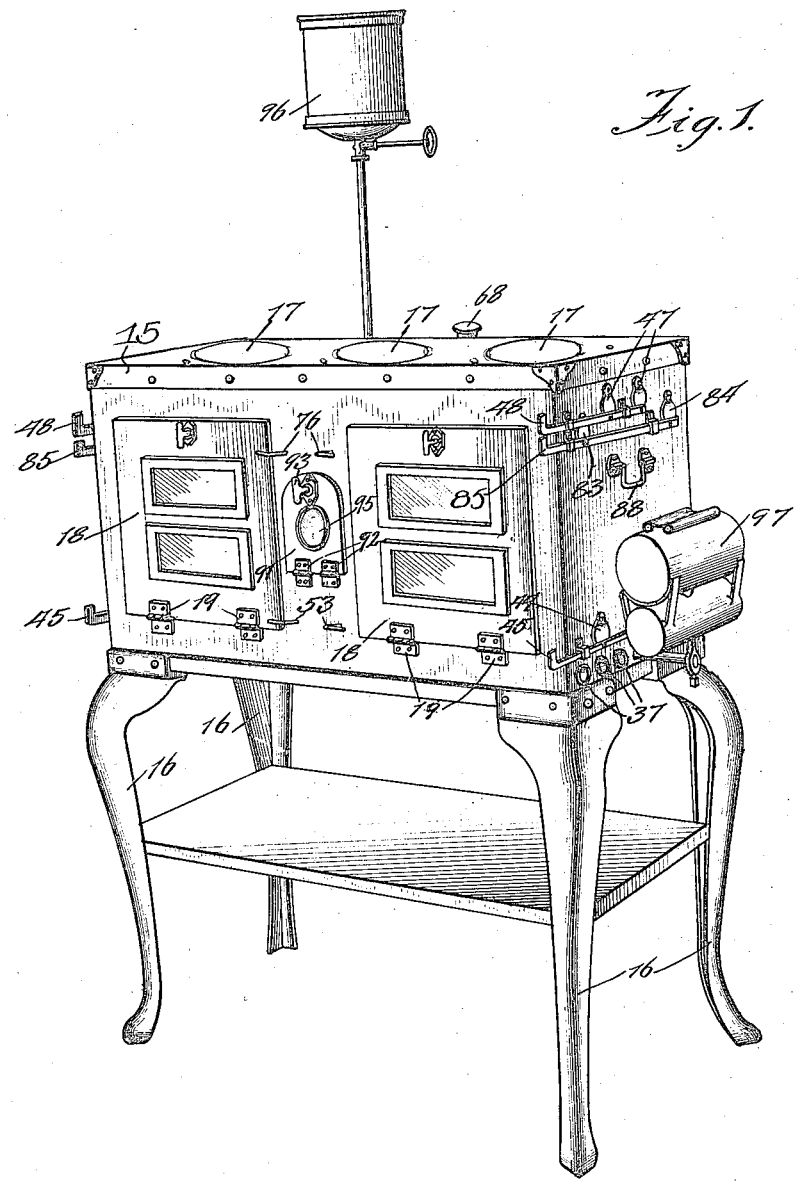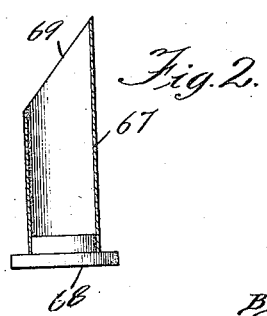

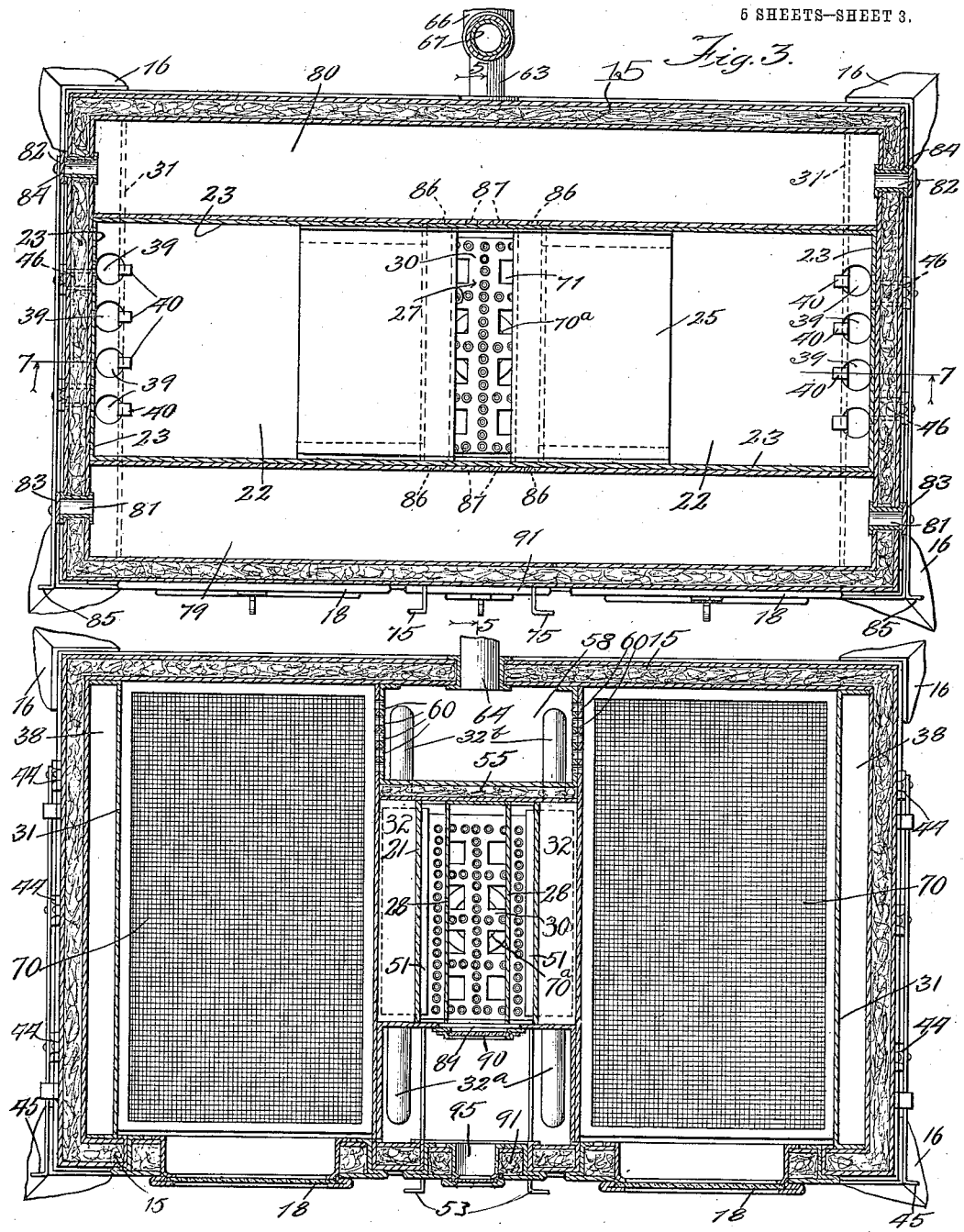

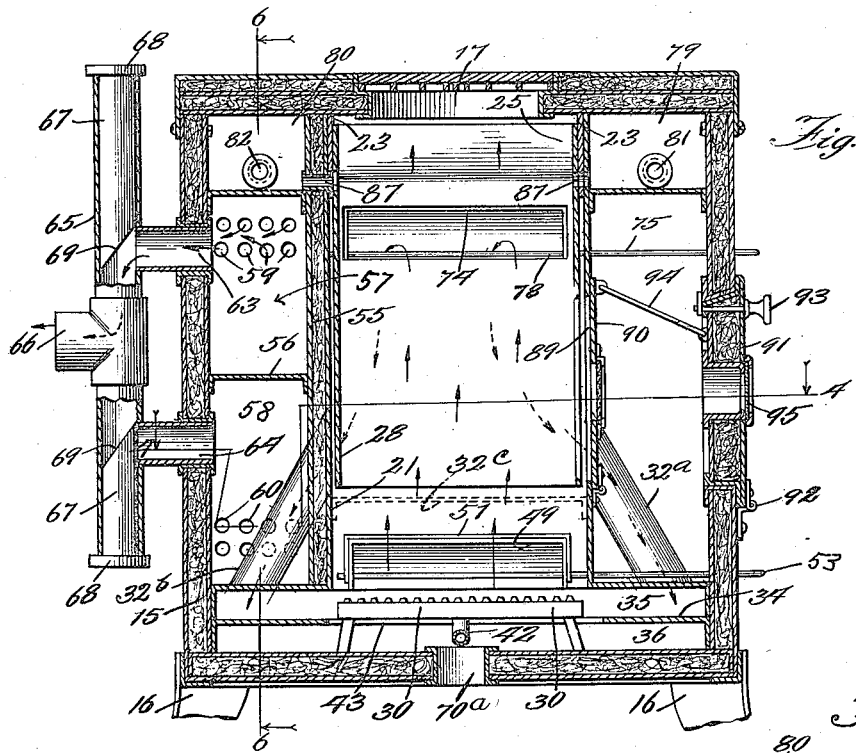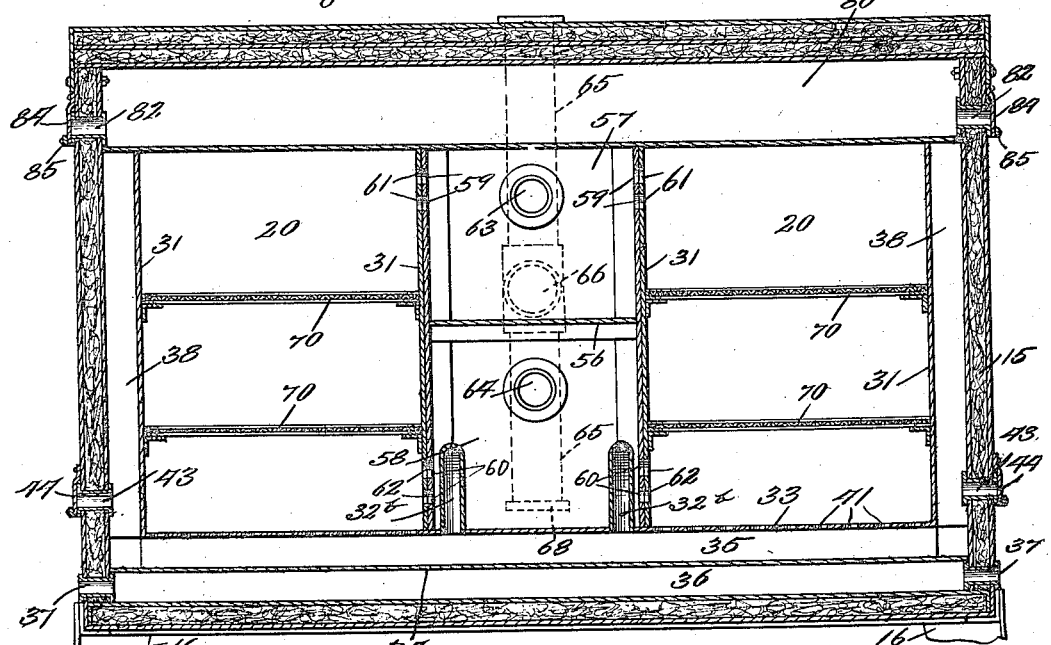

F. V. DETWILER.
COOKING APPARATUS.
APPLICATION FILED SEPT. 18, 1911.
1,125,075.
Patented Jan. 19, 1915.
5 SHEETS—SHEET 5.
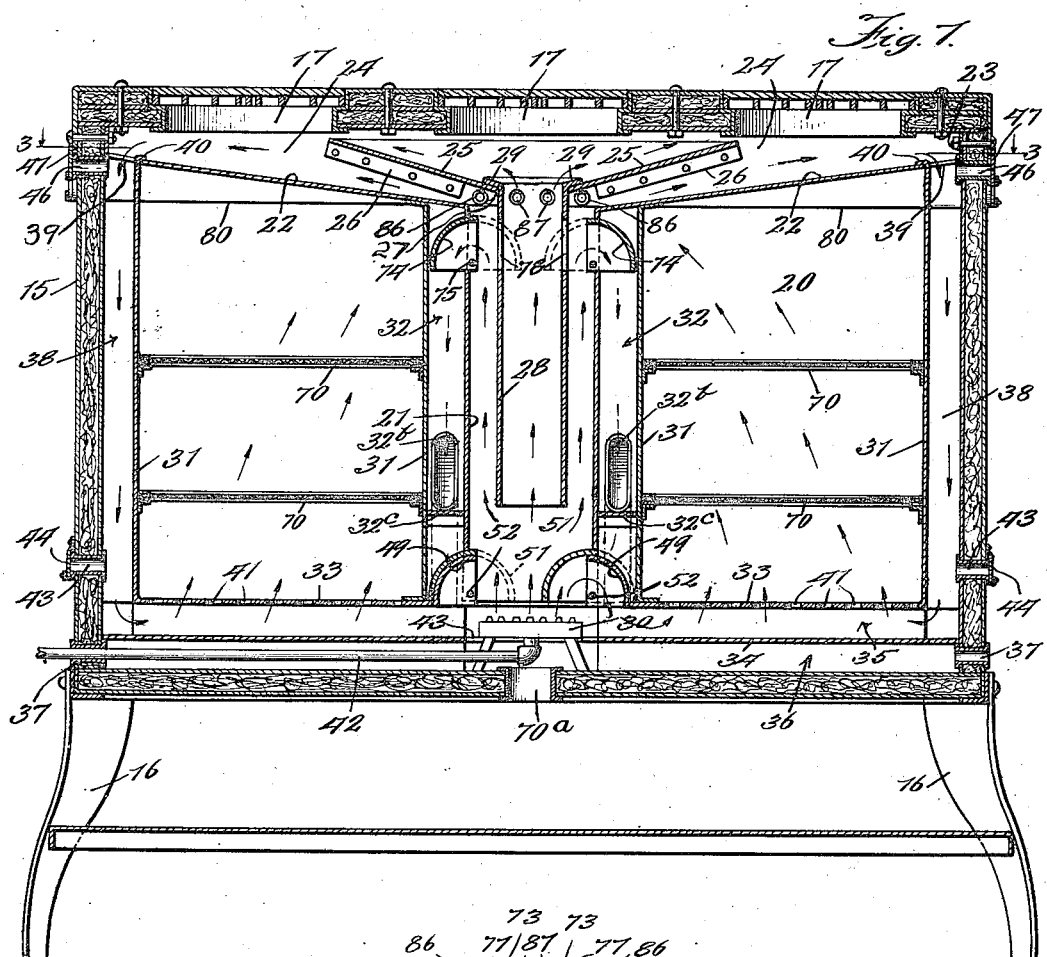
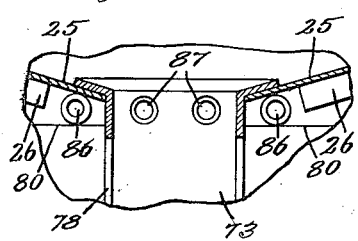
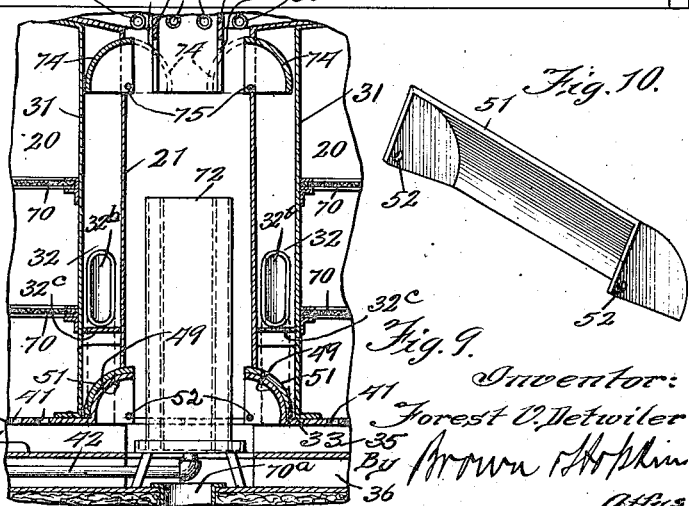
Witnesses:
Inventor:
Forest V. Detwiler
By Brown & Hopkins
Attys.

UNITED STATES PATENT OFFICE.

FOREST V. DETWILER, OF CHICAGO, ILLINOIS.

COOKING APPARATUS.

1,125,075.  Specification of Letters Patent.  Patented Jan. 19, 1915.

Application filed September 18, 1911. Serial No. 650,007.

*To all whom it may concern:*

Be it known that I, FOREST V. DETWILER, a citizen of the United States, residing at Chicago, in the county of Cook and State of Illinois, have invented certain new and useful Improvements in Cooking Apparatus, of which the following is a specification.

This invention relates to improvements in cooking apparatus constructed for the employment of gaseous fuel in connection with a burner and one of the objects of the invention is to provide an improved apparatus of this character which is adapted for the use of different kinds of fluid fuel such as gas and hydro-carbon oils, such as gasolene and kerosene.

A further object is to provide an improved apparatus of this class having means whereby cooking operations of different nature may be simultaneously carried on, and means whereby the circulation of the heated air or products of combustion may be controlled for the specific purposes, and at the will of the user.

A further object is to provide an improved portable apparatus of this character which will be simple, durable and cheap in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which—

Figure 1 is a perspective view of an improved apparatus of this class constructed in accordance with the principles of this invention. Fig. 1ª is a perspective view with the doors open. Fig. 2 is a detail view partly in elevation and partly in section of one of the controlling valves. Fig. 3 is a sectional view on line 3—3, Fig. 7 with the fuel tanks omitted. Fig. 4 is a sectional view on line 4—4, Fig. 5 with the fuel tanks omitted. Fig. 5 is a sectional view on line 5—5, Fig. 3. Fig. 6 is a sectional view on line 6—6, Fig. 5. Fig. 7 is a sectional view on line 7—7, Fig. 3. Fig. 8 is a view of a detail partly in elevation and partly in section. Fig. 9 is a detail view partly in elevation and partly in section showing a modified arrangement and the manner in which the apparatus may be adapted for the employment of a burner for a different kind of fuel. Fig. 10 is a detailed perspective view of one of the deflectors. Fig. 11 is a detail sectional view of a modification.

Referring more particularly to the drawings and in the present amplification of this invention, the numeral 15 designates generally the body of the apparatus comprising a casing which latter may be of any desired size and configuration, the walls of which are insulated in any suitable manner. This casing 15, is supported, in the present exemplification of the invention, upon legs 16, is provided with a plurality of stove holes 17, in the top wall thereof and also with door openings in one of the walls, which latter openings are closed by suitable doors or closures 18 hinged as at 19 to the casing. These door openings are preferably located adjacent each end of the casing and are arranged in front of the ovens designated generally by the reference numeral 20.

Arranged within the casing and preferably mid way of the ends thereof is a flue designated generally by the reference numeral 21, which may be of any desired size and configuration, but is preferably rectangular in cross section with its ends terminating short of the front and rear walls of the casing and is considerably less in width than the casing. A compartment 24 at the top of the flue comprises a bottom 22 which inclines downwardly from the extreme outer ends, or from the points adjacent the ends of the inclosing casing, to the top of the flue 21, at which latter place the compartment is in communication with the flue.

The bottom 22 is provided with a peripheral flange 23, which flange extends upwardly, to contact with the inner face of the wall or top of the inclosing casing to form the compartment designated generally by the reference numeral 24, which latter extends under all of the stove holes 17 in the top wall of the casing, so that the heated air which enters the flue 21 will flow therefrom into the compartment 24 to be discharged across the stove holes 17 in a manner to be set forth.

Arranged within the compartment 24 is an inverted spreader member 25 which is spaced from the top wall of the inclosing casing and also from the bottom 22 of the compartment 24 to form passages for the heated air on both sides of the member 25 and this member 25 is supported in any desired or suitable manner preferably by means of flanges 26 upon which the member 25 rests.

The spreader member is provided with an opening 27 disposed above and smaller than the flue 21, and a tubular member 28 having a flange 29 on one end thereof is removably supported by this member 25. This tubular member 28 is of an external diameter something less than the internal diameter of the flue 21, and projects into the flue through the opening 27, being supported by the flange 29 engaging and resting upon the upper surface of the member 25.

In the form of the invention shown in Fig. 7, the tubular member 28 is of some length and terminates in close proximity to the bottom of the flue 21 and is employed with the apparatus when a gas burner 30 is used as the heat supplying medium.

The ovens 20 are formed by spaced side walls 31 which extend across the casing 15, the back wall of the casing forming the back of the ovens while the front wall of the casing forms the front of the ovens. These ovens are respectively of a width somewhat greater than the width of the door openings in the front of the casing and by means of these door openings, access may be readily had to the interior of the ovens. The ovens are arranged on each side of the flue 21 and the adjacent walls 31 of the ovens are spaced from the adjacent walls of the flue 21, to form heated air passages or flues 32, the upper extremities of which latter are closed by the bottom 22 of the compartment 24.

The bottoms 33 of the ovens are disposed above the bottom of the inclosing casing to form a space between the bottoms of the ovens and the bottom of the inclosing casing. This space is divided by a partition 34 to form two horizontal passages 35—36, extending for the entire width and length of the inclosing casing.

The bottom passage 36 has communication through the wall of the casing with the outside air by means of the openings 37 leading through the wall of the casing and communicating with the passage.

The upper passage 35 extends under the ovens and has communication with flues or passages 38, which latter extend upwardly along the outer sides of the ovens between the walls of the ovens and the adjacent walls of the casing, and which passages 38 are formed by the respective walls of the casing and the walls of the oven, the latter being spaced from the respective walls of the casing for this purpose.

The bottom 22 of the compartment 24 is provided adjacent its extremities and preferably in close proximity to the end walls of the casing with a plurality of apertures or openings 39 which form communication between the compartment 24 and the respective passages 38.

The upper extremities of the walls 31 of the ovens may be secured in position in any suitable manner preferably by means of fastening ears or projections 40, carried by the walls and which project through the openings 39 and are flanged down upon the bottom 22.

The bottoms 33 of the ovens are provided with perforations or openings 41, to form communication between the ovens and the passage 35.

The burner 30, in the form shown in Fig. 7, is arranged within the casing and is supported by the bottom thereof and receives its supply through a suitable supply pipe 42, which latter extends from the outside through the wall of the casing and preferably into the passage 36. This burner 30 also projects through an opening 43, (see Fig. 7) in the partition 34 and is disposed directly beneath the flue 21 so that the heated air or products of combustion from the burner will enter the flue.

The casing 15 is provided with one or more openings 43 leading through the wall thereof adjacent the bottoms of the ovens, above the partition 34 and communicating with the passages 38 by means of which outside air may be admitted into these passages 38 to assist in inducing circulation of the heated air through these passages 38, and dampers 44 are provided for opening and closing these passages 43. These dampers may be manipulated by means of handles 45 connected to the dampers and the connection between these handles and the respective dampers is such that the dampers when adjusted by these handles will remain in their adjusted positions. Similar openings 46 are also provided in the wall of the casing and which have communication with the passages 38 adjacent the tops of the ovens and also adjacent the bottom 22 of the compartment 24, and in proximity to the openings 39. Similar dampers 47 are provided for controlling these openings 46 and handles 48 are connected with the dampers for controlling them.

The bottoms of the flues or passages 32 formed by the adjacent walls of the flue 21 and the ovens are closed as at 49 adjacent the bottoms of the ovens and the flue is provided with branches 32$^a$, 32$^b$ standing astride of the closure 49 and discharging respectively into the passage 35 adjacent the front and rear of the ovens thereof forming communication between the passages 32 and the respective ovens 20, whereby the heated air admitted into these passages, in a manner to be set forth, will be discharged into the ovens. A partition 32ᶜ is also provided across the passage 32 to direct the heated air which enters the passage into the branches 32ᵃ, 32ᵇ.

The closures 49 are preferably arcuate in configuration and a deflector 51 (see Fig. 10) of a similar configuration coöperates with these closures 49 for controlling or directing the heated air beneath the ovens and into the passage 35. These deflectors 51 are pivotally mounted as at 52 and extend over the closures 49.

An operating handle 53 is connected with each of the deflectors 51 and these handles extend through the front of the casing 15 preferably intermediate the doors 18, and by means of which handles the deflectors may be moved from the position shown in full lines in Fig. 7, to the position shown in dotted lines. When the deflectors are in the position in full lines on the left in said figure, the heated air or products of combustion from the burner, will pass up the flue 21 into the compartment 24 and across the stove holes 17, but when the deflectors are adjusted, to the position shown in full lines on the right in said figure, the heated air will be deflected by them and by the closure 49 into the passage 35 beneath the ovens from which passage it will enter the ovens through the openings 41 in the bottoms 33 thereof. These deflectors 51 are preferably of a size that when both are adjusted to the position shown in full lines on the right in Fig. 7, there will be a space between the deflectors so that a portion of the heated air from the burner will pass up the flue 21, while the greater portion of the heated air will be deflected as above described.

The gases are conducted from the lower ovens 20, into what might be termed an outlet chamber 58, through which chamber a portion of the branch 32ᵇ of the flue 32 projects. This chamber is arranged preferably between the walls 31 of the ovens, at the back of the casing 15 and behind the flue 21. In order to prevent the wall of this outlet chamber which is directly adjacent one wall of the flue 21 from absorbing to any extent the heat units, insulating material 55 is provided between the adjacent walls of the chamber and the flue.

The outlet chamber is divided by means of a partition 56 (see Figs. 5 and 6) into an upper compartment 57 and the lower compartment 58 and the walls of these compartments adjacent the walls 31 of the ovens are respectively provided with apertures or openings 59, 60, registering with openings 61, 62 in the walls 31 of the ovens to form communication between the ovens and the compartment 57, 58. These communicating passages will control the discharge of heated air and gases from the ovens to cause the heated air to either flow out of the top of the ovens or the bottoms thereof in a manner as will be described.

Communicating with the respective compartments 57, 58 and leading preferably through the rear wall of the casing 15, are tubular members or passages 63, 64, both of which communicate with another tubular member 65, preferably arranged uprightly with its ends open and a discharge outlet 66 is connected with the tubular member 65, between the tubular members 63, 64.

Arranged in the ends of the tubular member 65, are controlling valves 67 (see Figs. 2 and 5) which are preferably tubular in construction for the purpose of lightness and have a closed end 68 and an inclined or beveled end 69. These controlling valves are inserted into the respective ends of the tubular member 65 so that the closed ends 68 which preferably project beyond the periphery of the valves will rest against the ends of the tubular member 65, to form closures therefor and also to serve as handles by means of which the valves may be rotated in the tubular member 65. These valves are of such a length that the inclined or beveled ends 69, will terminate in close proximity to the respective passages 63, 64, so that when the valves are rotated, the inclined ends 69 will coöperate with the passages 63, 64 to vary the size thereof and also to form a closure for these passages.

In Fig. 5, the lowermost valve 67 is shown in a position in which it will close the opening 64 while the uppermost valve 67 is shown in a position that the passage 63 will be wide open. Thus it will be manifest that when the heated air is discharged into the ovens 20, it will pass out of the ovens into one of the other compartments 57—58 of the outlet chamber to be discharged from this chamber through the openings 63—64 according to the position of the respective valves 67 and from thence out of the discharge outlet 66.

In order to permit a ready circulation of the heated air through the ovens 20, the shelves 70 in the ovens may be constructed of any suitable perforated or reticulated material.

The deflectors 51 are employed when a gas burner 30 is used and the operation of the apparatus with such a burner will now be described. Outside air, in order to support combustion, is supplied to the burner through the passage 36 and also through the opening 70ᵃ in the bottom of the casing. The burner 30 is also provided with air openings 71 therethrough as shown more clearly in Fig. 3.

Assuming the deflectors 51 and the deflectors 74 (the latter to be hereinafter referred to) to be in the position shown in full lines on the left in Fig. 7 and it is desired to use the stove holes 17 and not the ovens, the dampers 47 may be opened and the heated air discharged into the flue 21 from the burner 30 will be divided, a portion thereof passing inside of the flue or tubular member 28 while the remaining portion will pass between the tubular member 28 and the wall of the flue 21. The heated air from the flue 21 will flow into the chamber 24 between the bottom 22 thereof and the member 25 while the heated air in the tubular member 28 will be discharged through the member 25 to the stove hole directly thereover. The openings 46 will cause or induce a circulation of the heated air across the stove holes as will be understood. Should it now be desired to employ the stove holes as well as the ovens, the openings 46 are closed and the openings 43 opened. These latter openings will further induce a circulation of the heated air from the chamber 24, through the passages 38 into the passage 35 and from this passage into the ovens through the openings 41 in the bottoms 33 thereof to be discharged from the ovens through the passages 63—64 as described. Should it now be desired to employ the ovens for quick baking, the deflectors 51 are adjusted to the position shown in dotted lines on the left and full lines on the right in Fig. 7, so as to cut off a greater portion of the heated air from the flue 21 and divert it into the passage 35 to be discharged into the ovens.

A portion of the heated air will pass between the deflectors into the flue 21 to be conveyed to the stove holes.

When it is desired to employ only one of the ovens for baking purposes, the respective deflectors 51 may be adjusted for the purpose, but when both ovens are employed both deflectors 51 are used to divert the heated air. Obviously if the upper valve 67 is opened and the lower valve 67 closed, (Fig. 5) the heated air will flow out of the top of the ovens and vice versa.

In order to adapt this apparatus for the employment of liquid fuel, such as gasolene, kerosene, or hydro-carbon oils, all that is necessary is to remove the burner 30 and place a burner 72 (see Fig. 9) in its place. Inasmuch as these hydro-carbon burners are considerably larger than the ordinary gas burner, it is necessary to replace the tube 28 with a shorter tube 73, to permit the burner 72 to be placed in position. This can readily be accomplished, owing to the fact that the tube 28 is removable. When removed, the tube 73 which is identical in construction with the tube 28, with the exception of the length thereof, may be readily placed in position. In order that these hydro-carbon oils may be employed, deflectors 74 (see also Fig. 7) similar to the deflectors 51 are provided adjacent the tops of the passages 32, which latter it has been stated, are closed. These deflectors 74 are pivotally supported as at 75 and are arcuate in construction and handles 76 which extend through the front of the casing are connected to the deflectors for manipulating the latter. When not in use the deflectors extend into the passages 32 so as not to obstruct the flow of heated air through the flue 21. When in use, these deflectors 74 are adjusted by means of handles 76 into the position shown in dotted lines in Fig. 9 to intercept the flow of heated air and divert the air into the passages 32 through the openings in the wall of the passages 32 and through which openings the deflectors 74 operate. The heated air thus directed into the passages 32 will flow down the passages and into the branches 32$^a$, 32$^b$ into the passage 35 from where it flows into the oven 20 through the openings 41 in the bottoms 23 of the ovens.

The tubular members 73 and 28 are respectively provided with openings 77—78 in their walls into which openings the deflectors 74 project as shown in Fig. 9.

Obviously, when the longer tube 28 is employed or a gas burner employed, the deflectors 74 may be placed into operation instead of the deflectors 51.

It has been found that better results can be obtained by supplying outside air to the top of the flue 21, especially when the larger burners are employed, inasmuch as this additional supply of air will prevent the flame from becoming smothered. In order therefore to accomplish this, there is provided within the casing 15, two air chambers 79, 80, (see Fig. 3), one arranged at the front and one at the rear of the casing and on opposite sides of the flue and ovens. These chambers 79—80 are preferably located adjacent the top of the inclosing casing, as shown more clearly in Fig. 5 and may be of any desired size, the walls 31 of the ovens being cut away to permit these chambers to be formed. The chambers are provided respectively with openings 81, 82, extending through the walls of the casing and communicating with the outside air by means of which outside air may be supplied thereto and dampers 83, 84 are provided for respectively controlling these openings. The dampers on each end of the casing are connected by means of operating handles 85 so that they may be simultaneously operated. These chambers 79 and 80 have communication with the flue 21 by means of openings 86 (see Figs. 3, 7 and 8), and also have communication with the tubular members 28, 73 according to which is employed, through openings 87 and the air is drawn in through these openings by the circulation of the heated air within the casing.

Handles 88 may be provided on the casing 15 by means of which it may be transported.

In order to gain access to the burner and to the interior of the flue 21, there is provided in the flue adjacent the front of the casing a door opening 89, which latter is provided with a door or closure 90, (see particularly Figs. 1ª, 4 and 5). The front wall of the casing 15 is also provided with a door opening 91ª having a closure 91, which is hinged as at 92 and has an operating handle and lock 93. This door 91 is connected with the door 90 by means of a connecting rod 94 which rod is so arranged that when the door 91 is opened, the door 90 will also be opened and the connecting rod will simultaneously close the door 90 with the door 91. A sight opening 95 may be provided in the door 91. The front of the flue 21 terminates short of the front wall of the casing 15 and the door 90 is adapted to swing in the space thus formed between the flue and the front of the casing.

Gasolene may be supplied to the burner from a gasolene tank 96 supported by the casing and kerosene may be supplied to the burner from the kerosene tank 97 also supported by the casing.

It is to be understood that the form of burner used for the different hydro-carbon oils forms no part of the present invention, suffice it to say that any form of a burner which is adapted for the employment of liquid fuel such as kerosene, gasolene, or hydro-carbon oil, may be employed at the will of the operator and according to the nature of the fuel employed.

In the form of the invention shown in Fig. 11, deflectors 98 which are preferably flat are employed instead of the deflectors 49 and these deflectors 98 are adapted to open or close one or more openings 99 in the wall of the flue 21 and a flue 100 is arranged within the passage 32 adjacent these openings 99 and this flue 100 has communication with the passage 35 beneath the oven. When the deflectors 99 are in the position shown in full lines in Fig. 11, the flue 100 will be closed and the heated air will pass up the flue 21 in the manner similar to the other forms of the invention, but when these deflectors are adjusted to the position shown in dotted lines in Fig. 11, a portion of the heated air will be diverted from the flue 21 through the openings 99 into the passage 35 to flow into the oven through the openings 41 in the bottom 33 thereof.

Deflectors 101, similar to the deflectors 98, are provided in place of the deflectors 74 and these deflectors 101 control one or more openings 102 in the wall of the flue 21, thereby forming communication between the flue 21 and the passage 32 so that when the deflectors 101 are in the position shown in full lines in Fig. 11, and the deflectors 98 closed, the heated air will be diverted by the deflectors 101 into the passage 32 through the openings 102 and will flow from this passage 32 into the passage 35, with which the passage 32 has communication, to be discharged into the oven 20 through the bottom thereof. During the passage of the heated air through this passage 32 it will flow around the flue 100 as the latter is closed to the passage, as shown.

With this improved construction and the manner of controlling the flow of the heated air, it will be manifest that absolute control may be had by adjusting the deflectors and these deflectors may be adjusted with respect to each other so that the temperature of one of the ovens may be raised to the desired degree for baking purposes, while the temperature in the other oven may be maintained considerably lower.

Obviously, when the stove holes 17 are not to be employed, they are closed by the closures shown in Fig. 7, so that the openings 46—43 whichever are open, will induce the desired circulation of the heated air. When the stove holes are employed, the vessels which are placed thereon will serve as the closures therefor, so that the induced circulation of the heated air will not be interfered with.

What is claimed as new is:

1. A cooking apparatus embodying a casing having one or more stove holes, a flue leading to the stove holes, a source of supply of heat discharging into the flue, spaced ovens in the casing, arranged on opposite sides of the flue, additional flues leading to the respective ovens and having inlets adjacent the first said flue, and intercepters individual to the said additional flues adapted to be adjusted with relation to their respective flues to form extensions to the said additional flues to intercept the passage of heated air through the first said flue and for diverting it into the said additional flues, and means individual to the intercepters for controlling them at will.

2. A cooking apparatus embodying a casing having one or more stove holes, a flue leading to the stove holes, a source of supply of heat discharging into the flue, spaced ovens in the casing arranged on opposite sides of the flue, additional flues leading to the respective ovens and having inlets adjacent the first said flue, and intercepters individual to the said additional flues adapted to intercept the passage of the heated air through the first said flue and for directing it into the said additional flues, and means individual to the intercepters for controlling them at will, said intercepters when employed forming a passage therebetween for a portion of the heated air into the first said flue.

3. A cooking apparatus embodying a casing having one or more stove holes therein, a flue leading to the stove holes, a source of supply of heat discharging into the flue, spaced ovens arranged on opposite sides of the flue, additional flues leading to the respective ovens and having inlets adjacent the first said flue, intercepters individual to said additional flues adapted to be projected into the first said flue above the source of supply of heat to form extensions of the said additional flues for directing heated air into the said additional flues, and means for controlling the intercepters.

4. A cooking apparatus embodying a casing having one or more stove holes therein, a flue leading to the stove holes, a source of supply of heat discharging into the flue, spaced ovens arranged on opposite sides of the flue, additional flues leading to the respective ovens and having inlets adjacent the first said flue, intercepters individual to said additional flues adapted to be projected into the first said flue above the source of supply of heat for directing the heated air into the said additional flues, and means for controlling the intercepters, said intercepters being disposed in substantially the same horizontal plane and forming when in use a space therebetween for the passage of a portion of the heated air into the first said flue.

5. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors, one disposed adjacent the inlet of each of the said additional flues and adapted to be projected to form extensions of the respective additional flues to intercept heated air and direct it into the respective additional flues, and passage ways leading from the first said flue around the respective ovens.

6. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors, one disposed adjacent the inlet of each of the said additional flues, and adapted to be projected to form an extension of the respective additional flues to intercept heated air and direct it into the respective additional flues, and passage ways leading from the first said flue around the respective ovens and having communication with the respective additional flues.

7. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors one disposed adjacent the inlet of each of the said additional flues, and adapted to be projected to intercept heated air and direct it into the respective additional flues, and passage ways leading from the first said flue around the respective ovens, said intercepters when in use terminating short of each other to form a passage therebetween for the heated air in the first said flue.

8. A cooking apparatus embodying a casing having one or more stove holes therein, a flue leading to the stove holes, a source of supply of heat discharging directly into the flue, an oven in the casing, a flue leading to the oven and having an inlet communicating with the first flue, an intercepter adapted to be positioned to direct heated air into the second recited flue, an additional intercepter adjacent the bottom of the first named flue and means whereby the latter may be adjusted to direct a portion of the heated air from the lower end of the flue to the bottom of the oven.

9. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors, one disposed adjacent the inlet of each of the said additional flues to form extensions of the latter and adapted to be projected to intercept heated air and direct it into the respective additional flues, and passage ways leading from the first said flue around the respective ovens, there being means for inducing a circulation of the heated air across the stove holes.

10. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors, one disposed adjacent the inlet of each of the said additional flues and adapted to be projected to form extensions of the additional flues to intercept heated air and direct it into the respective additional flues, and passage ways leading from the first said flue around the respective ovens, there being means for inducing circulation of the heated air through the said passage ways.

11. A cooking apparatus embodying a casing having one or more stove holes, a flue leading to the stove holes, a source of supply of heat discharging into the flue, spaced ovens in the casing on opposite sides of the flue, additional flues leading to the ovens and having inlets adjacent the first said flue, curved deflectors, one disposed adjacent the inlet of each of the said additional flues and adapted to be projected to form extensions of the additional flues to intercept heated air and direct it into the respective additional flues, and passage ways leading from the first said flue around the respective ovens, there being means for inducing a circulation of the heated air across the stove holes and through the said passage ways.

12. A cooking apparatus embodying a casing, having stove holes therein, a flue leading to the stove holes, a source of supply of heat discharging into the flue, an oven in the casing, one wall of which is spaced from the flue to form a passage leading to the oven and having an inlet communicating with the flue, an intercepter adapted to be projected into the flue to divert heated air into the passage, an additional flue also leading to the oven through a portion of said passage and having an inlet communicating with the first said flue, a second intercepter adapted to be projected above the source of supply of heat to divert the air into the said additional flue, and means for controlling the said intercepters at will.

13. A cooking apparatus embodying a casing, having stove holes therein, a flue leading to the stove holes, a source of supply of heat discharging into the flue, an oven in the casing, one wall of which is spaced from the flue to form a passage leading to the oven and having an inlet communicating with the flue, an intercepter adapted to be projected into the flue to direct heated air into the passage, an additional flue also leading to the oven through a portion of said passage and having an inlet communicating with the first said flue, a second intercepter adapted to be projected above the source of supply of heat to direct air into the said additional flue, means for controlling the said intercepters at will, and a passage communicating with the first said flue, leading around the oven and communicating with the second said flue.

14. A cooking apparatus embodying a casing, having stove holes therein, a flue leading to the stove holes, a source of supply of heat discharging into the flue, an oven in the casing, one wall of which is spaced from the flue to form a passage leading to the oven and having an inlet communicating with the flue, an intercepter adapted to be projected into the flue to direct heated air into the passage, an additional flue also leading to the oven through a portion of said passage and having an inlet communicating with the first said flue, a second intercepter adapted to be projected above the source of supply of heat to direct air into the said additional flue, means for controlling the said intercepter at will, there being means for inducing circulation of the heated air through the passage.

15. A cooking apparatus embodying a casing having stove holes therein, a flue leading to the stove holes, a source of supply of heat discharging into the flue, means disposed adjacent the outlet of the flue for diverting heated air and directing it to the stove holes, said means embodying a removable element projecting into the flue, an oven, a second flue leading to the oven and having its inlet adjacent the first said flue, and an intercepter for controlling the second flue, said intercepter being adapted to be projected into the path of the movement of heated air through the first said flue for diverting the heated air into the second flue.

16. A cooking apparatus embodying a casing having stove holes therein, a flue leading to the stove holes, a source of supply of heat discharging into the flue, means disposed adjacent the outlet of the flue for dividing the heated air and directing it to the stove holes, said means embodying a removable element projecting into the flue, an oven, a second flue leading to the oven and having its inlet adjacent the first said flue, and an intercepter for controlling the second flue, said intercepter being adapted to be projected into the path of movement of the heated air through the first said flue for directing a portion of the heated air into the second flue.

17. A cooking apparatus embodying a casing having stove holes therein, a flue leading to the stove holes, a source of supply of heat discharging into the flue, means disposed adjacent the outlet of the flue for dividing the heated air and directing it to the stove holes, said means embodying a removably supported tubular element projecting into the flue, an oven, a second flue leading to the oven and having its inlet adjacent the first said flue, and an intercepter for controlling the second flue, said intercepter being adapted to be projected into the path of movement of the heated air through the first said flue for directing heated air into the second flue.

18. A cooking apparatus embodying a casing having stove holes therein, a flue leading to the stove holes, a source of supply of heat discharging into the flue, means adjacent the outlet of the flue for dividing and directing the heat to the stove holes, said means embodying a removably supported tubular member projecting into the flue, an oven in the casing, a second flue leading to the oven and means arranged at different points along the first said flue for 19. A cooking apparatus embodying a casing having stove holes therein, a flue leading to the stove holes, a source of supply of heat discharging into the flue, means adjacent the outlet of the flue for dividing and directing the heat to the stove holes, said means embodying a removably supported tubular member projecting into the flue through an opening in the wall thereof, and means for supplying outside air at different points in the flue.

20. A cooking apparatus embodying a casing having stove holes therein, an upright flue leading to the stove holes, a burner discharging into the flue, a spreader member at the top of the flue to divide and direct the heat to the stove holes, means for supplying outside air adjacent the inlet of the flue, and means for also supplying outside air adjacent the top of the flue, the last said means embodying a chamber having communication with the outside air and also with the said flue.

21. A cooking apparatus embodying a casing having stove holes therein, a flue leading to the stove holes, a burner discharging into the flue, a spreader member at the top of the flue to divide and direct the heat to the stove holes, means for supplying outside air to the burner adjacent the flue inlet, means for also supplying outside air adjacent the outlet of the flue and embodying a chamber having communication with the outside air and also with the flue, and means for controlling the admission of the outside air to the chamber.

22. A cooking apparatus embodying a casing, an oven therein, a source of supply of heat for the oven, an outlet chamber comprising a plurality of compartments and having means forming communication respectively between the compartments and the upper and the lower part of the oven, tubular outlet members communicating with both of the compartments and means for controlling the closing or opening of either one or both of said compartments to the outlet to control the circulation of the heated air in the oven.

23. A cooking apparatus embodying a casing, an oven therein, a source of supply of heat for the oven, an outlet chamber comprising a plurality of compartments having openings forming communication respectively between the compartments and the upper and the lower part of the oven, tubular outlet members communicating with both of the compartments, and means for closing or opening either one or both of said compartments to the outlet to control the circulation of the heated air in the oven.

24. A cooking apparatus embodying a casing, an oven therein, a source of supply of heat for the oven, an outlet chamber comprising a plurality of compartments having perforated walls forming communication respectively between the compartments and the upper and the lower part of the oven, an outlet pipe leading from each compartment, each of said pipes having an open end, a discharge pipe connecting the outlet pipes, and a rotatable valve for controlling the size of the openings of each of said outlet pipes.

25. A cooking apparatus embodying a casing, an oven therein, a source of supply of heat for the oven, an outlet chamber comprising a plurality of compartments with perforated walls forming communication respectively between the compartments and the upper and the lower part of the oven, an outlet leading from both of the compartments and having a common discharge, said outlet being provided with branches individual to the compartments, and a valve in each branch for controlling the respective branches.

26. A cooking apparatus embodying a casing, an oven therein, a source of supply of heat for the oven, an outlet chamber embodying two compartments having openings forming communication respectively between the compartments and the upper and lower part of the oven, an outlet leading from each compartment, a tubular member connecting the outlets, and a discharge outlet for the tubular member, said member having open ends adjacent each of the said outlets from the compartments, and a valve projecting into each of the said open ends, and adjustable with relation to the respective outlets for varying the size thereof.

27. A cooking apparatus embodying a casing, an oven therein, a source of supply of heat for the oven, an outlet chamber embodying two compartments with perforated walls forming communication respectively between the compartments and the upper and lower part of the oven, an outlet leading from each compartment, a tubular member connecting the outlets, and a discharge outlet for the tubular member, said member having open ends adjacent each of the said outlets from the compartments, and a valve projecting into each of the said open ends, said valves being rotatable and having inclined ends movable across the respective outlets for varying the size thereof.

28. A cooking apparatus embodying a casing having an oven therein, a passage in communication with an oven, a source of supply of heat, a plurality of flues leading to the passage having inlets at different distances from the source of supply of heat, and an intercepter mounted in the inlet of each flue normally ineffective but movable into the path of movement of the heated air from the source of supply to direct more or less heat to the oven passage in accordance with the passage of said intercepters.

In testimony whereof I have signed my name to this specification, in the presence of two subscribing witnesses, on this 14th day of September A. D. 1911.

FOREST V. DETWILER.

Witnesses:
CHARLES H. SEEM,
K. W. WONNELL.